US012729729B2

(12) United States Patent
Fang et al.

(10) Patent No.: US 12,729,729 B2
(45) Date of Patent: Sep. 8, 2026

(54) LIGHT METAL STRUCTURE-FUNCTION DUAL-GRADIENT COMPOSITE BRAKE DISC (BRAKE DRUM)

(71) Applicants: Ming Fang, Hebei (CN); Shu Fang, Hebei (CN)

(72) Inventors: Ming Fang, Hebei (CN); Shu Fang, Hebei (CN)

( * ) Notice: Subject to any disclaimer, the term of this patent is extended or adjusted under 35 U.S.C. 154(b) by 481 days.

(21) Appl. No.: 18/193,120

(22) Filed: Mar. 30, 2023

(65) Prior Publication Data

US 2023/0235802 A1 Jul. 27, 2023

Related U.S. Application Data

(63) Continuation of application No. PCT/CN2020/119158, filed on Sep. 30, 2020.

(51) Int. Cl.

*F16D 65/12* (2006.01)
*F16D 69/02* (2006.01)
*F16D 65/02* (2006.01)

(52) U.S. Cl.

CPC ......... *F16D 65/127* (2013.01); *F16D 65/125* (2013.01); *F16D 69/027* (2013.01);
(Continued)

(58) Field of Classification Search

CPC ........... F16D 65/12; F16D 65/123–127; F16D 69/027; F16D 2065/1308; F16D 2200/003;
(Continued)

(56) References Cited

U.S. PATENT DOCUMENTS 5,163,526 A * 11/1992 Morgun ................ F16D 65/127 188/218 XL
6,032,767 A * 3/2000 Roehling ............. F16D 65/092 188/73.1
(Continued)

FOREIGN PATENT DOCUMENTS

CN 201944156 U 8/2011
CN 106499741 A 3/2017
(Continued)

OTHER PUBLICATIONS

Biaoqiang et al., "Technical specification of brake pads for urban rail vehicles," Technical Equipment Professional Committee of China Urban Rail Transit Association, CZJS/T 0012-2016, Feb. 4, 2016.
(Continued)

*Primary Examiner* — Christopher P Schwartz

(57) ABSTRACT

The present disclosure provides a light metal structure-function dual-gradient composite brake disc or brake drum. The light metal structure-function dual-gradient composite brake disc or brake drum is made of a light metal/graded ceramic skeleton composite friction layer bearing friction and wear functions and having function (performance) gradient characteristics and a light metal bearing connection and structure functions and having structure gradient characteristics with the light metal/graded ceramic skeleton composite friction layer by integrated composite casting. Such a dual-gradient brake disc or brake drum can exert the advantages of large thermal capacity, rapid thermal dissipation, and insensitivity to cracks of the light metal, and high hardness, high shear resistance, high elastic modulus, and excellent thermal shock resistance of the graded ceramic skeleton. In addition, the light metal/graded ceramic skeleton composite friction layer can withstand higher tempera-
(Continued)

tures without softening and deformation, such that a temperature during friction braking is more uniform.

15 Claims, 21 Drawing Sheets

(52) U.S. Cl.
CPC ................ *F16D 2065/1308* (2013.01); *F16D 2200/0008* (2013.01); *F16D 2200/003* (2013.01); *F16D 2200/0047* (2013.01); *F16D 2250/0007* (2013.01)

(58) Field of Classification Search
CPC ..... F16D 2200/0047; F16D 2200/0008; F16D 2250/0007
USPC .................................................... 188/218 XL
See application file for complete search history.

(56) References Cited

U.S. PATENT DOCUMENTS

| | | | | |
|---|---|---|---|---|
| 7,220,458 | B2 * | 5/2007 | Hollis | C23C 4/02 427/446 |
| 7,261,192 | B2 * | 8/2007 | Khambekar | F16D 65/127 188/218 XL |
| 9,581,211 | B2 * | 2/2017 | Holly | C23C 8/58 |
| 10,197,121 | B2 * | 2/2019 | Filip | F16D 65/127 |
| 11,686,359 | B2 * | 6/2023 | Linhoff | F16D 65/125 188/218 XL |
| 11,788,593 | B2 * | 10/2023 | Carminati | C23C 4/08 188/218 XL |
| 12,313,135 | B2 * | 5/2025 | Steinmeier | B23K 26/0006 |
| 2008/0196985 | A1 * | 8/2008 | Meckel | F16D 65/127 188/218 XL |

FOREIGN PATENT DOCUMENTS

| | | | | |
|---|---|---|---|---|
| CN | 106499754 A | | 3/2017 | |
| CN | 106499755 A | | 3/2017 | |
| CN | 106499756 A | | 3/2017 | |
| CN | 107100949 A | * | 8/2017 | C22C 1/05 |
| CN | 110962501 A | | 4/2020 | |
| DE | 102018222687 A1 | * | 6/2020 | F16D 5/127 |
| JP | 1137192 A | | 2/1999 | |

OTHER PUBLICATIONS

International Search Report and Written Opinion for PCT Appl. No. PCT/CN2020/119158, mailed Apr. 25, 2021.

Jishan et al., “Brake disc rolling stock,” National Railway Administration, TB/T2980-2014, Sep. 26, 2014.

* cited by examiner

Dalian Key Laboratory of Brake Materials for High-speed Trains
No. 794, Huanghe Road, Shahekou District, Dalian City, Liaoning Province, China
0411-84109429

Brake disc diameter: 640 mm
Friction area: 400 cm²

Test date: April 21, 2018
Friction radius: 247 mm
Disc load: 7 t

Sample No.: TY BG36-1804-ZJTL02

Maximum braking temperature in 1st to 125th tests

FIG. 8B
Braking pressure: 45.6 kN
Braking No.: 7 8 9 10 11
0.6
0.5
0.3
30
60
90
Speed [km/h]

Dalian Key Laboratory of Brake Materials for High-speed Trains
No. 794, Huanghe Road, Shahekou District, Dalian City, Liaoning Province, China
0411-84109429

Brake disc diameter: 640 mm
Friction area: 400 $cm^2$

Test date: April 21, 2018
Friction radius: 247 mm
Disc load: 7 t

Sample No.: TY BG36-1804-ZJTL02

Instantaneous friction coefficient curve under drying condition

Dalian Key Laboratory of Brake Materials for High-speed Trains
No. 794, Huanghe Road, Shahekou District, Dalian City, Liaoning Province, China
0411-84109429

Brake disc diameter: 640 mm
Friction area: 400 cm²

Test date: April 21, 2018
Friction radius: 247 mm
Disc load: 7 t

Sample No.: TY BG36-1804-ZJTL02

Instantaneous friction coefficient curve under drying condition

Dalian Key Laboratory of Brake Materials for High-speed Trains
No. 794, Huanghe Road, Shahekou District, Dalian City, Liaoning Province, China
0411-84109429

Brake disc diameter: 640 mm
Friction area: 400 $cm^2$

Instantaneous friction coefficient curve under drying condition

Annex III to the report

| Dalian Key Laboratory of Brake Materials for High-speed Trains | Sample No.: 200106271 | Report No.: BG235-2001-FM01 | Client: Fang Ming |
|---|---|---|---|

Annex III to the report

Dalian Key Laboratory of Brake Materials for High-speed Trains | Sample No.: 190315132 | Report No.: BG235-2001-FM01 | Client: Fang Ming Annex III to the report

| Dalian Key Laboratory of Brake Materials for High-speed Trains | Sample No.: 200106271 | Report No.: BG235-2001-FM01 | Client: Fang Ming |
|---|---|---|---|

Annex III to the report

| Dalian Key Laboratory of Brake Materials for High-speed Trains | Sample No.: 190315132 | Report No.: BG235-2001-FM01 | Client: Fang Ming |
|---|---|---|---|

Annex III to the report

| Dalian Key Laboratory of Brake Materials for High-speed Trains | Sample No.: 200106271 | Report No.: BG235-2001-FM01 | Client: Fang Ming |
|---|---|---|---|

Annex III to the report

Dalian Key Laboratory of Brake Materials for High-speed Trains | Sample No.: 190315132 | Report No.: BG235-2001-FM01 | Client: Fang Ming Annex III to the report

| Dalian Key Laboratory of Brake Materials for High-speed Trains | Sample No.: 200106271 | Report No.: BG235-2001-FM01 | Client: Fang Ming |
|---|---|---|---|

Annex III to the report

Annex III to the report

| Dalian Key Laboratory of Brake Materials for High-speed Trains | Sample No.: 200106271 | Report No.: BG235-2001-FM01 | Client: Fang Ming |
|---|---|---|---|

Annex III to the report

Dalian Key Laboratory of Brake Materials for High-speed Trains | Sample No.: 200106271 | Report No.: BG235-2001-FM01 | Client: Fang Ming Instantaneous friction coefficient curve

LIGHT METAL STRUCTURE-FUNCTION DUAL-GRADIENT COMPOSITE BRAKE DISC (BRAKE DRUM)

CROSS-REFERENCE TO RELATED APPLICATIONS

The present application is a continuation of, and claims priority to and the benefit of, International Patent Application No. PCT/CN2020/119158, titled "LIGHT METAL STRUCTURE-DUAL FUNCTIONAL GRADIENT COMPOSITE MATERIAL BRAKE DISC (DRUM)", and filed on Sep. 30, 2020, the entire contents of which are hereby incorporated by reference in entirety for all purposes.

TECHNICAL FIELD

The present disclosure relates to a light metal structure-function dual-gradient composite brake disc or brake drum made of a light metal/graded ceramic skeleton composite friction layer bearing friction and wear functions and a light metal bearing connection and structure functions by integrated composite casting, and the light metal structure-function dual-gradient composite brake disc or brake drum is used in friction clutch and braking of vehicles, including but not limited to, rail transit and highway traffic vehicles.

BACKGROUND

At present, most of the brake discs or brake drums, including but not limited to the brake discs or brake drums of rail transit and highway traffic vehicles, are mainly made of the whole ferrous metal materials. The brake disc or brake drum has a high density, which is not conducive to weight reduction. The brake disc or brake drum has poor thermal conductivity, which results in high friction surface temperature rise during friction braking. Due to a large temperature difference, hot spots are easily formed in different areas of the friction surface, resulting in hot cracks. The concentration of thermal stress inside the disc body and the formation of internal cracks are also easily caused.

Even the existing metal ceramic composite brake disc or brake drum is often made of the same material as the friction layer and the matrix structure. The production cost is high, and thermal fatigue cracks are easily formed in the bonding interface of metal and ceramic, affecting the service life. The carbon/carbon or carbon/ceramic composite brake disc or brake drum is cost-ineffective. In addition, if the carbon/carbon or carbon/ceramic composite brake disc or brake drum is connected with metal structures by mechanical methods, thermal conduction is affected because of the contact interface between the two materials, causing high friction layer temperature. All of the above factors adversely affect the use of the carbon/carbon or carbon/ceramic composite brake disc or brake drum.

With the popularization and application of lightweight technology aimed at weight reduction, energy saving, emission reduction and cost reduction, preparing a lightweight brake disc or brake drum from ceramic reinforced aluminum alloy can significantly reduce the weight of the brake disc or brake drum. In addition, the noise and temperature rise during friction braking are greatly reduced, the wear resistance of the clutch plate and the brake disc or brake drum is improved, and the service life is prolonged. However, the ceramic particle reinforced aluminum alloy composite has a low elastic modulus. In particular, with the softening of aluminum alloy matrix at high temperature, the elastic modulus of the ceramic particle reinforced aluminum alloy composite brake disc decreases sharply. In addition, with the continuous development of various vehicles towards high speed and heavy load, higher requirements are put forward for many factors that directly affect the properties of metal/ceramic composites such as the bonding strength of the interface of the ceramic particle reinforced metal composites, the shape of ceramic reinforcements, and the uniformity of ceramic reinforcements in the reinforced metal.

Compared with the traditional ferrous metal and the existing aluminum alloy composite brake disc or brake drum, the light metal structure-function dual-gradient composite brake disc or brake drum of the present disclosure is designed according to the structure of the brake disc or brake drum and the function of different parts. The characteristics of a graded ceramic skeleton are made full use of: excellent fatigue resistance, wear resistance, thermal shock resistance, and thermal stability, low coefficient of thermal expansion, and gradient change of pore size and structure form from the friction surface to the inside, and gradient change of corresponding performance. The characteristics of a light metal are also made full use of: rapid thermal dissipation, easy forming, and easy processing. The graded ceramic skeleton and the light metal form the lightweight light metal structure-function dual-gradient composite brake disc or brake drum with structure gradient and function and performance gradient composite performance characteristics by integrated composite casting. The light metal/graded ceramic skeleton composite friction layer formed by the graded ceramic skeleton and bearing friction and wear functions has high specific compressive strength, specific stiffness, and specific modulus, excellent fatigue resistance, wear resistance, thermal shock resistance, and thermal stability, and has function and performance gradient characteristics, and the light metal/graded ceramic skeleton composite friction layer and the light metal bearing connection and structure functions have structure gradient characteristics. Therefore, many shortcomings of other types of brake discs or brake drums are overcome.

Compared with the ferrous metal brake disc or brake drum of the same size in service at present, the light metal structure-function dual-gradient composite brake disc or brake drum of the present disclosure is reduced by about 60% in weight, and has improved thermal dissipation performance (the temperature rise is reduced by 20% under the same braking condition, the time for reduction to the same temperature is nearly 50% less, and the temperature difference between different areas of the friction surface is smaller) due to the function and performance gradient characteristics of the light metal/graded ceramic skeleton composite friction layer. The friction and wear performance is optimized (the friction coefficient is more stable during the same cooling, etc.), and the light metal structure-function dual-gradient composite brake disc or brake drum can be industrialized at low cost. Therefore, the light metal structure-function dual-gradient composite brake disc or brake drum shows an excellent application prospect in the fields of rail transit, highway traffic, and machinery manufacturing, especially in the field of friction brake materials.

SUMMARY

The present disclosure provides a light metal structure-function dual-gradient composite brake disc or brake drum. Specifically, by applying a pressure to molten light metal in a furnace to overcome surface tension of a small (capillary) pore of the graded ceramic skeleton, the molten light metal is cast into the graded ceramic skeleton to form the light metal structure-function dual-gradient composite brake disc or brake drum by integrated composite casting. A light metal/graded ceramic skeleton composite friction layer formed by the graded ceramic skeleton bears friction and wear functions, and the light metal bears connection and structure functions. The light metal/graded ceramic skeleton composite friction layer formed by the graded ceramic skeleton and bearing friction and wear functions has function and performance gradient change characteristics, and forms the light metal structure-function dual-gradient composite brake disc or brake drum with the light metal by integrated composite casting. Therefore, the light metal/graded ceramic skeleton composite friction layer and the light metal bearing connection and structure functions have structure gradient change characteristics, and the light metal structure-function dual-gradient composite brake disc or brake drum has structure gradient and function and performance gradient composite performance characteristics. In addition, the light metal structure-function dual-gradient composite brake disc or brake drum has the advantages of high cost-effectiveness, smooth friction braking, low noise, light weight, short production cycle, rapid thermal dissipation, excellent thermal stability, long service life, and convenient and labor-saving disassembly and installation.

To achieve the above objective, the present disclosure adopts the following technical solutions:

First, a light metal material with high temperature performance meeting the use requirements, excellent casting performance, and no violent reaction with a reinforced ceramic skeleton is selected. An aluminum alloy with high cost-effectiveness, large thermal capacity, rapid thermal conduction, excellent comprehensive performance and mature production process is preferred. A prepared continuous structural phase graded ceramic skeleton is put into a cavity of a casting mold, and by applying a pressure to the molten light metal in the furnace to overcome surface tension of a small (capillary) pore of the graded ceramic skeleton, the molten light metal is cast into the graded ceramic skeleton to form the light metal structure-function dual-gradient composite brake disc or brake drum integrating the light metal/graded ceramic skeleton composite friction layer bearing friction and wear functions and the light metal bearing connection and structure functions by integrated composite casting. Such a brake disc or brake drum (FIG. 1 and FIG. 2) significantly improves friction and wear performance of the light metal/graded ceramic skeleton composite friction layer, ensures seamless and rapid conduction of heat in the light metal with excellent thermal conductivity, and easily realizes cost-effective and large-scale production. As shown in FIG. 1 and FIG. 2, the light metal composite brake disc includes a composite friction layer and a light metal structural body integrally cast therewith. The light metal structural body forms a mounting structure configured to connect the brake disc to an axle or hub assembly. Specifically, the mounting structure comprises a central locating hole for aligning the disc on the axle hub, and a plurality of circumferentially arranged bolt holes for receiving bolts to secure the disc to the hub.

By comprehensively considering thermal shock resistance, wear resistance, thermal conductivity, specific heat capacity, density, shrinkage deformation during sintering, and cost, the continuous structural phase graded ceramic skeleton in the light metal/graded ceramic skeleton composite friction layer bearing friction and wear functions adopts continuous structural phase silicon carbide graded ceramic skeletons including but not limited to continuous structural phase silicon carbide graded ceramic skeletons with gradient change characteristics in pore size and structure form of a three-dimensional network structure form and a two-dimensional honeycomb structure form, and preferably adopts reaction sintered silicon carbide graded ceramic skeletons with higher cost-effectiveness.

Free silicon in the reaction sintered silicon carbide graded ceramic skeleton can obviously improve wettability of the light metal to the graded ceramic skeleton, and improve difficulty of a reaction between silicon carbide graded ceramic skeletons and an aluminum alloy matrix during high temperature composite casting:

$$3SiC+4Al=Al_4C_3+3Si.$$

Therefore, the damage of an interface between SiC and the aluminum alloy matrix caused by the formation of $Al_4C_3$ and the reduction of the mechanical properties of the composite caused by its electrochemical corrosion in water are avoided, and various properties of the composite are improved.

The present disclosure aims to make the same heat in the friction braking process be absorbed quickly and evenly by the whole brake disc or brake drum and be quickly dissipated into the air in case of wear, reduce a surface temperature difference between different areas of the light metal/graded ceramic skeleton composite friction layer bearing friction and wear functions, and reduce thermal stress at the binding part of the light metal/graded ceramic skeleton composite friction layer and the light metal bearing connection and structure functions. Thus, an interface of the continuous structural phase graded ceramic skeleton in the light metal/graded ceramic skeleton composite friction layer and the light metal bearing connection and structure functions includes but is not limited to an inclined plane (FIG. 3), a convex plane (FIG. 4), a concave plane (FIG. 5), and a sawtooth shape (FIG. 6), so as to give full play to function and performance gradient change characteristics of the light metal/graded ceramic skeleton composite friction layer formed by the structural graded ceramic skeleton and the light metal, and achieve rapid thermal dissipation of the light metal.

In addition, in order to ensure that the thermal dissipation performance of the friction layer is basically unchanged before the wear reaches the limit, a pore diameter of the continuous structural phase graded ceramic skeleton in the light metal/graded ceramic skeleton composite friction layer bearing friction and wear functions can be set to have a gradient change, changing from small to large (FIG. 7) or from large to small, when the continuous structural phase ceramic skeleton extends from a position perpendicular to a friction surface to a disc body.

The composite friction layer bearing friction and wear functions has a thickness 1-5 mm greater than a wear limit-reaching size of the brake disc or brake drum, so as to ensure that when the composite friction layer is worn to the limit position, the elastic modulus remains unchanged under the action of braking pressure, there is no furrow on the friction surface, and the friction coefficient remains stable.

In order to improve the high temperature performance of the light metal matrix in the light metal structure-function dual-gradient composite brake disc or brake drum, the light metal is strengthened and toughened by nano-materials. The continuous structural phase graded ceramic skeleton is strengthened and toughened by nano-ceramic particles or ceramic fibers.

The present disclosure aims to ensure that the light metal matrix of the light metal structure-function dual-gradient composite brake drum is neither cracked nor broken under the condition of larger braking pressure (radial outward tension), and the braking stroke of the brake shoe is not increased and the braking effect is not delayed due to the larger coefficient of thermal expansion of the light metal matrix under the condition of higher friction braking temperature. Thus, the light metal structure-function dual-gradient composite brake drum of the present disclosure is further provided with a cylindrical ferrous metal mesh and a cylindrical mesh ferrous metal plate by integrated composite casting. The cylindrical ferrous metal mesh and cylindrical mesh ferrous metal plate do not affect the thermal dissipation effect, and can enhance strength of the light metal as a matrix in the light metal structure-function dual-gradient composite brake drum and limit thermal expansion and deformation of the light metal.

DETAILED DESCRIPTION OF THE EMBODIMENTS

Example 1

Example 1 shows curves of partial data of a bench test of a subway vehicle with a BD2500/15000 brake power 1:1 test bench conducted by a third party in accordance with CZJS/T 0012-2016 Technical specification of brake pads for urban rail vehicles by using a brake disc of the present disclosure.

Figure 1:
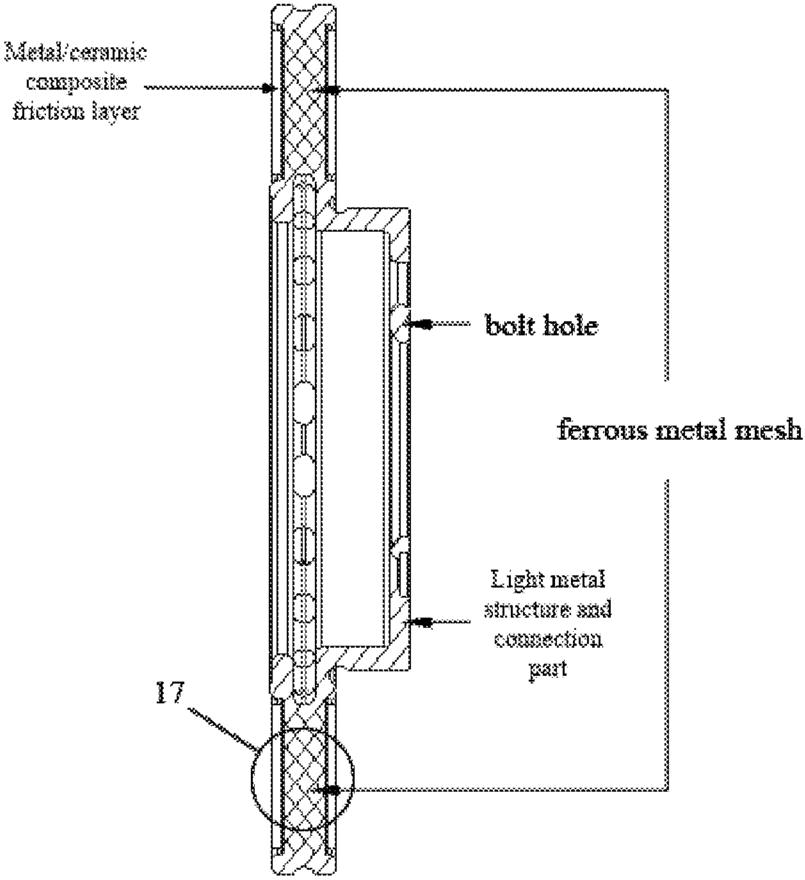
FIG. 1 is a sectional diagram of a light metal structure-function dual-gradient composite brake disc (brake drum)
Figure 2:
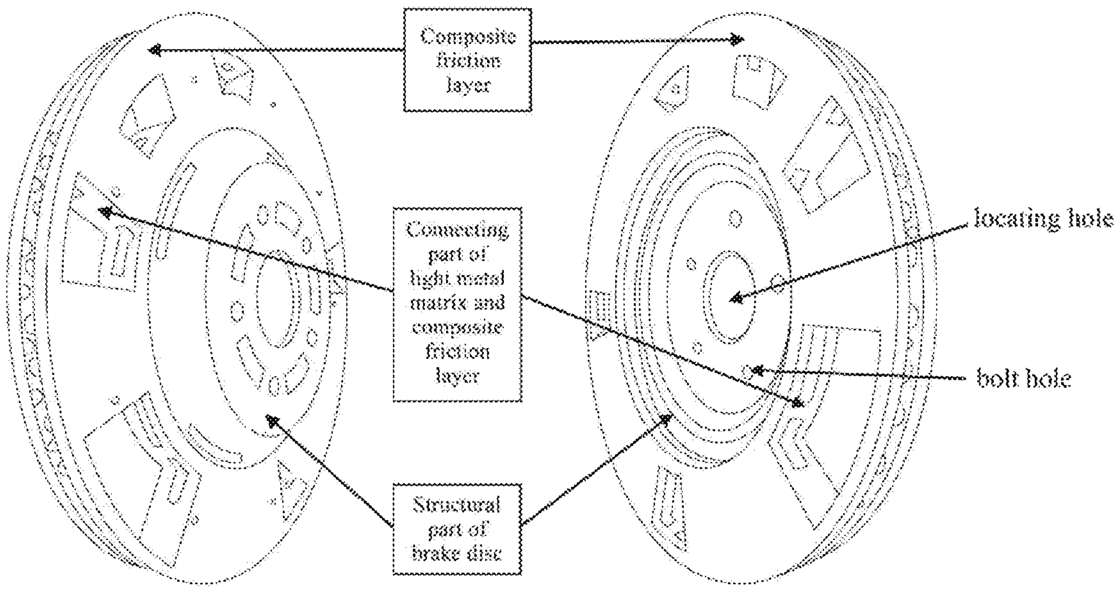
FIG. 2 shows photos of the light metal structure-function dual-gradient composite brake disc (brake drum)
Figure 3:
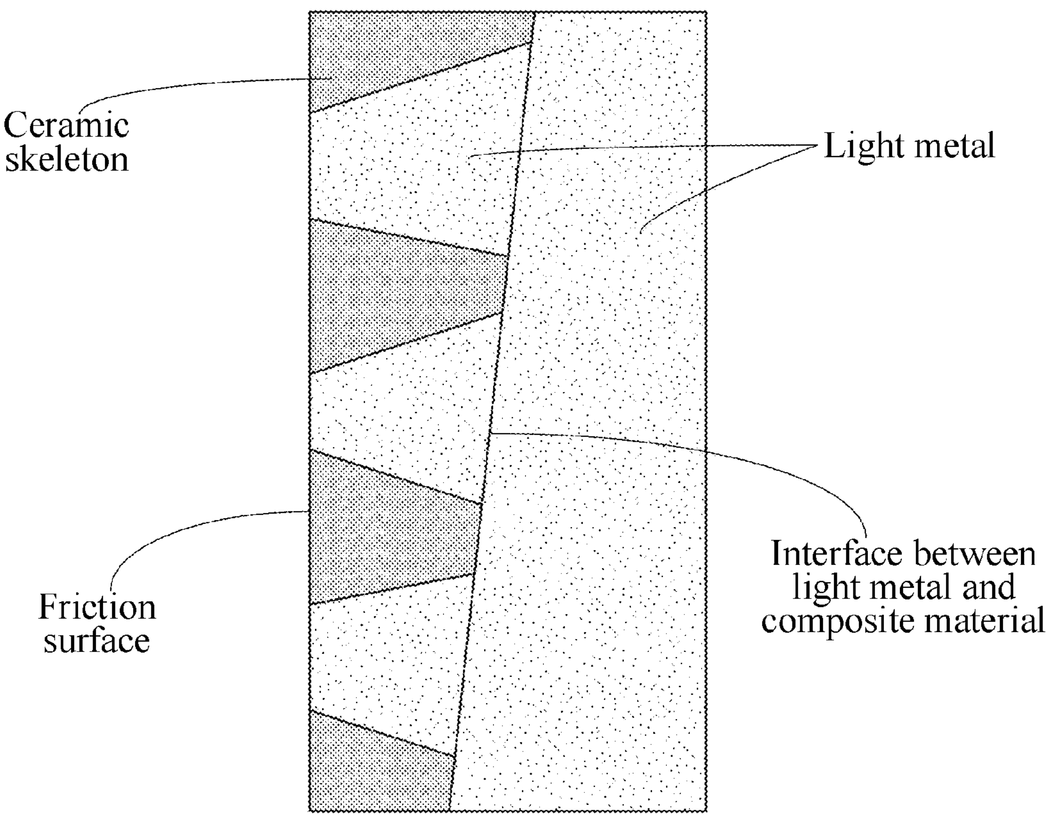
FIG. 3 is a schematic diagram of a ceramic skeleton having an inclined side in a binding part between a composite friction layer and a light metal, with a plurality of pores defined in this inclined side of the ceramic skeleton, each pore having a diameter exhibiting a gradient in a direction pointing from the ceramic skeleton to the light metal.
Figure 4:
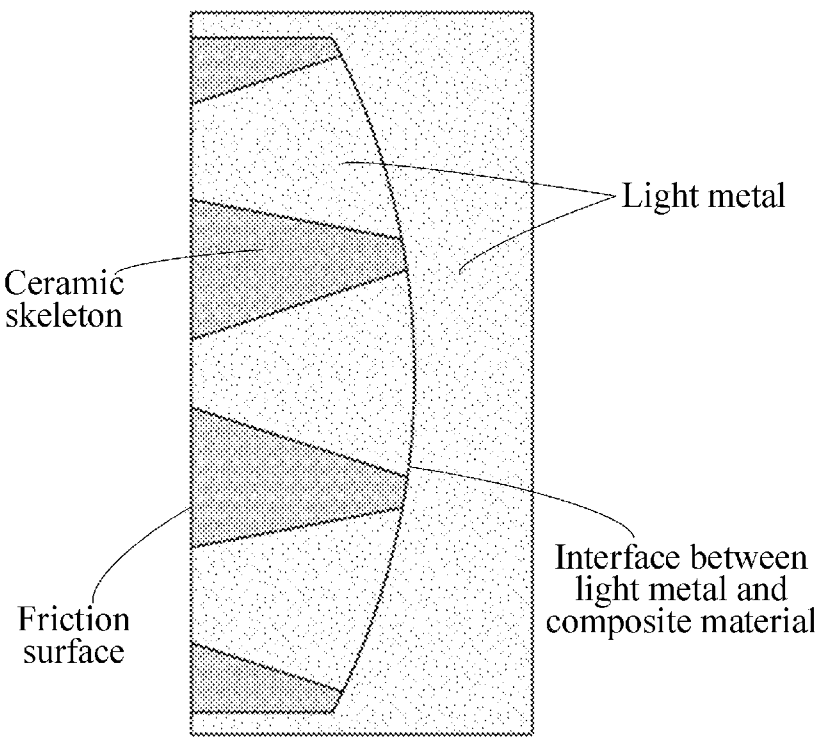
FIG. 4 is a schematic diagram of a ceramic skeleton having a convex side in the binding part between the composite friction layer and the light metal, with a plurality of pores defined in this convex side of the ceramic skeleton, each pore having a diameter exhibiting a gradient in a direction pointing from the ceramic skeleton to the light metal.
Figure 5:
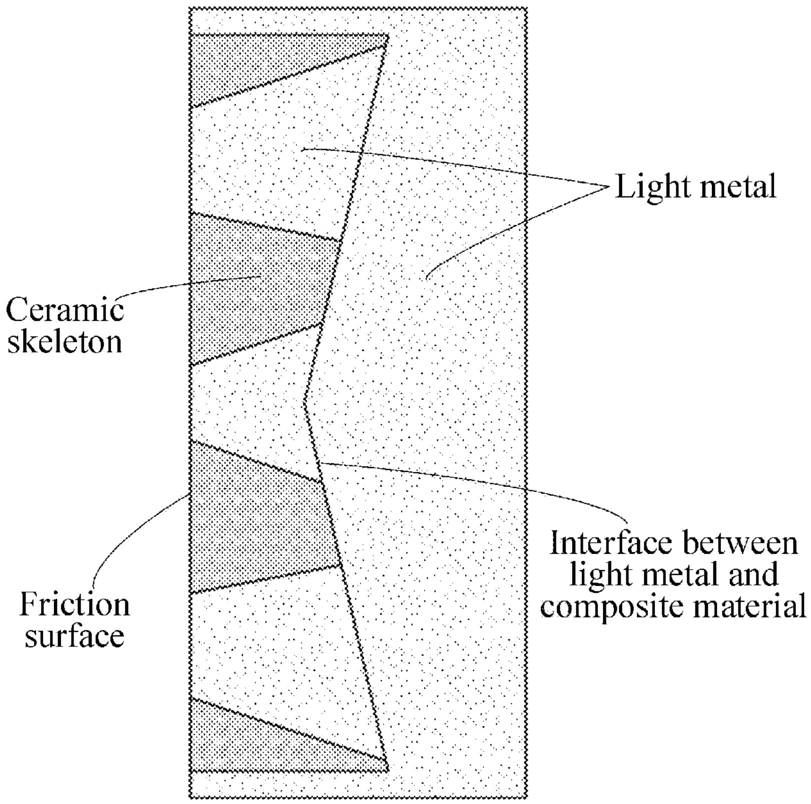
FIG. 5 is a schematic diagram of a ceramic skeleton having a concave side in the binding part between the composite friction layer and the light metal, with a plurality of pores defined in this concave side of the ceramic skeleton, each pore having a diameter exhibiting a gradient in a direction pointing from the ceramic skeleton to the light metal.
Figure 6:
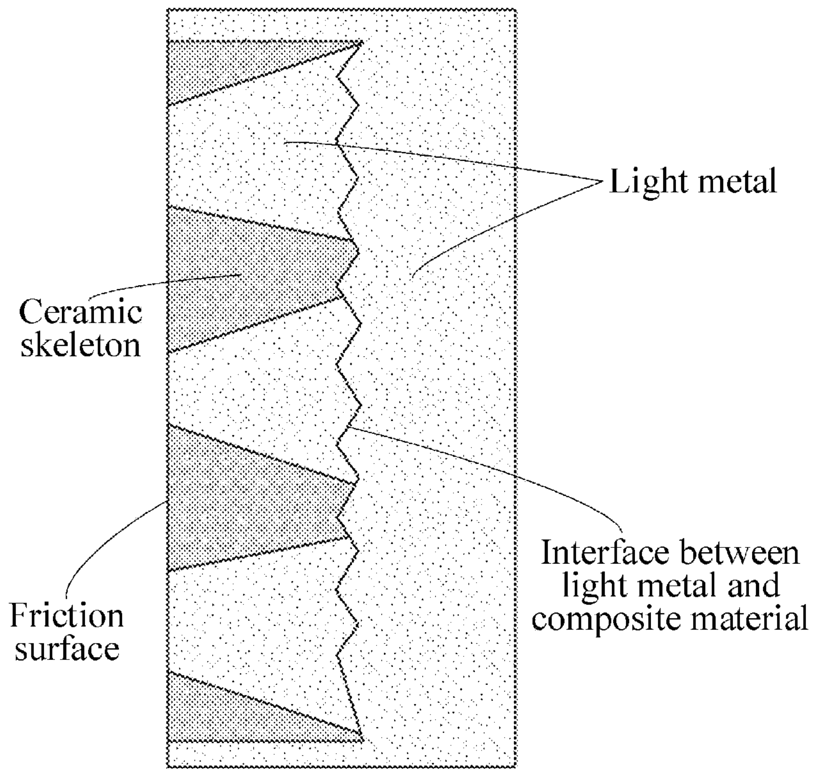
FIG. 6 is a schematic diagram of a ceramic skeleton having a sawtooth side in the binding part between a composite friction surface and the light metal, with a plurality of pores defined in this sawtooth side of the ceramic skeleton, each pore having a diameter exhibiting a gradient in a direction pointing from the ceramic skeleton to the light metal.
Figure 7:
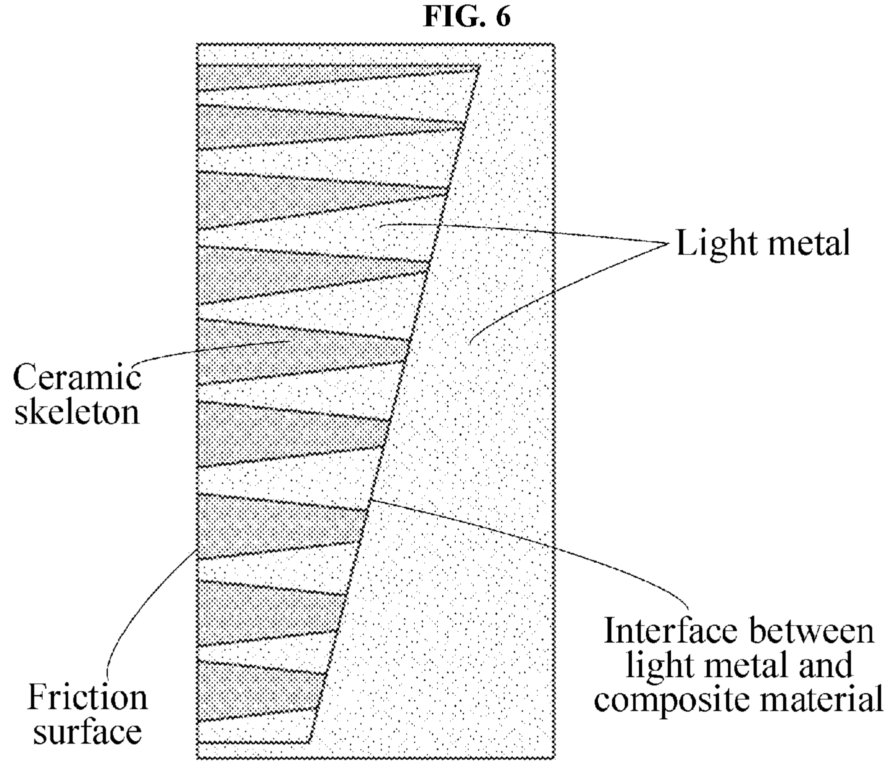
FIG. 7 is a schematic diagram of a pore of the ceramic skeleton having a diameter exhibiting a gradient changing from small to large along a direction of extending from the ceramic skeleton to the light metal matrix.
Figure 8A:
FIG. 8A to 8D show curves in a 1:1 bench test of a subway with the brake disc of the present disclosure.
Figure 8A:
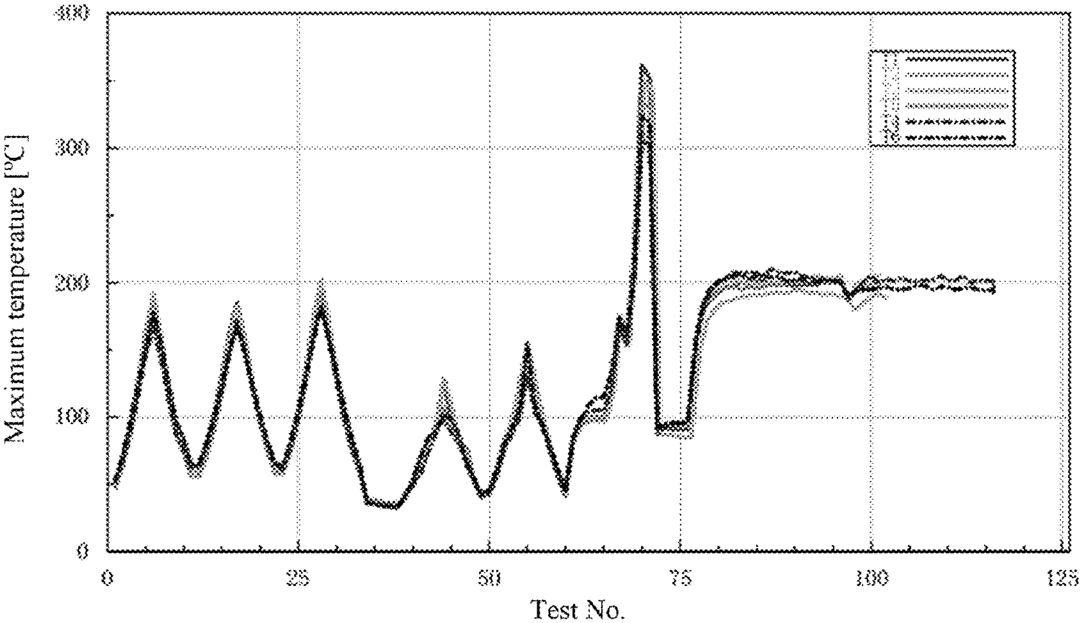
Figure 8B:
Figure 8C:
Figure 8C:
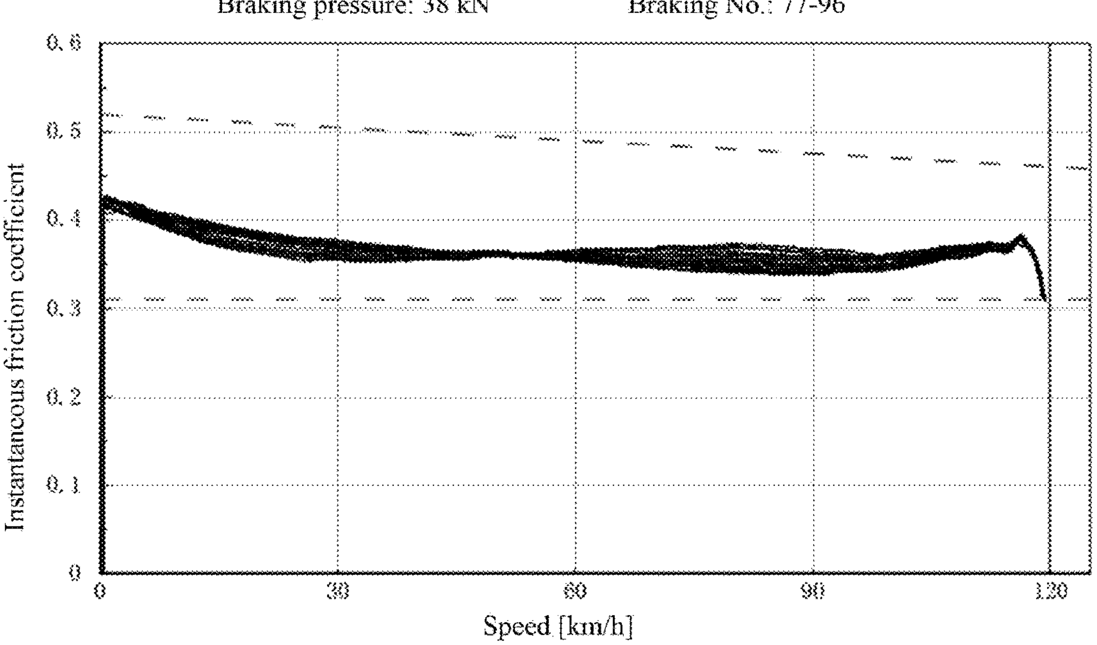
Figure 8D:

It can be seen from curves of all test data (FIG. 8A), friction coefficient curves at different speeds (FIG. 8B) and test data curves under simulated conditions (FIG. 8C) and (FIG. 8D) that the friction coefficient is uniform and stable, and the temperature rise is low.

Example 2

Example 2 shows curves of partial data of a bench test of a motor train set at 250 km/h with a BD2500/15000 brake power 1:1 test bench conducted by a third party in accordance with TB/T2980-2014 Brake disc rolling stock by using a brake disc of the present disclosure and a cast steel brake disc.

Figure 9A:
FIG. 9A and FIG. 9B show a comparison of cyclic braking times in 1:1 bench tests with the brake disc of the present disclosure and the cast steel brake disc.
Figure 9A:
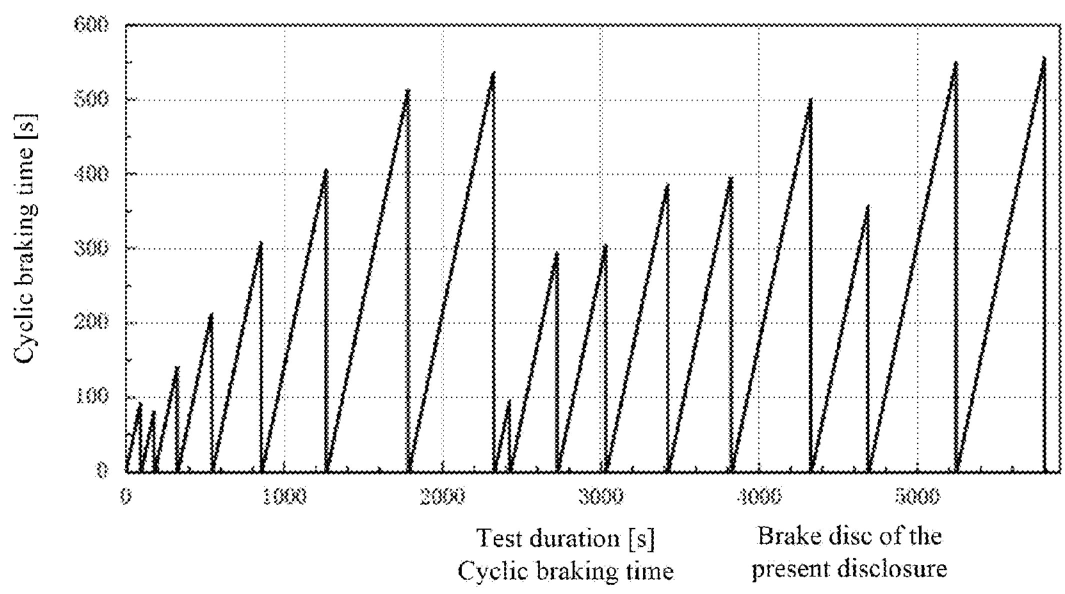
Figure 9B:
Figure 9B:
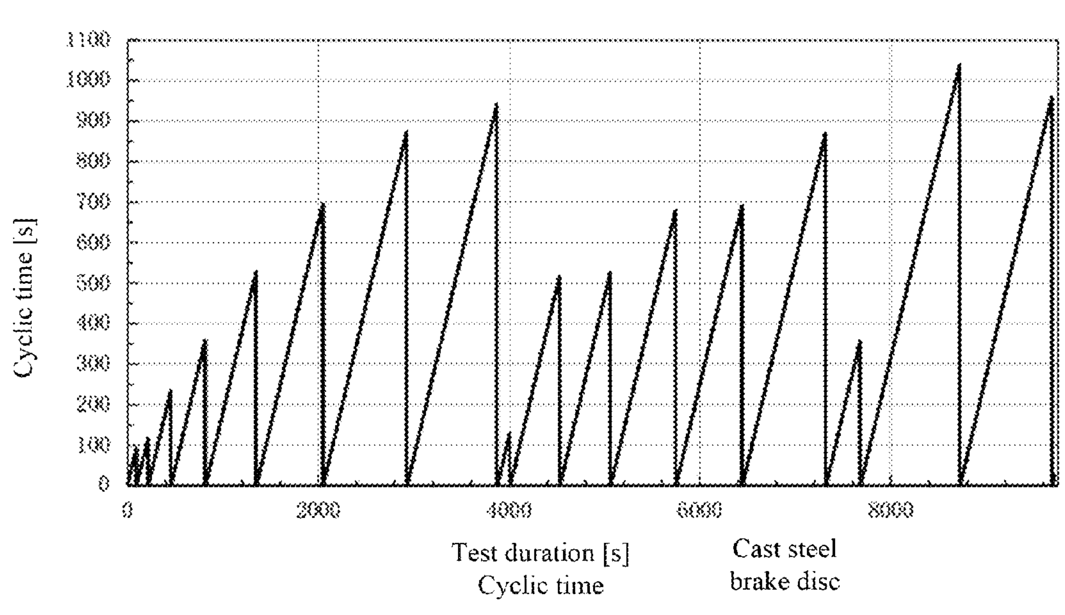

It can be seen from FIG. 9A and FIG. 9B that the cooling time of the brake disc of the present disclosure (FIG. 9A) is nearly 50% less than that of the cast steel brake disc (FIG. 9B) under the same braking conditions.

Figure 10A:
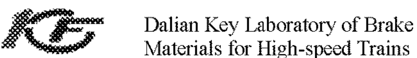
FIG. 10A and FIG. 10B show a comparison of temperature rises in the 1:1 bench tests with the brake disc of the present disclosure and the cast steel brake disc.
Figure 10A:
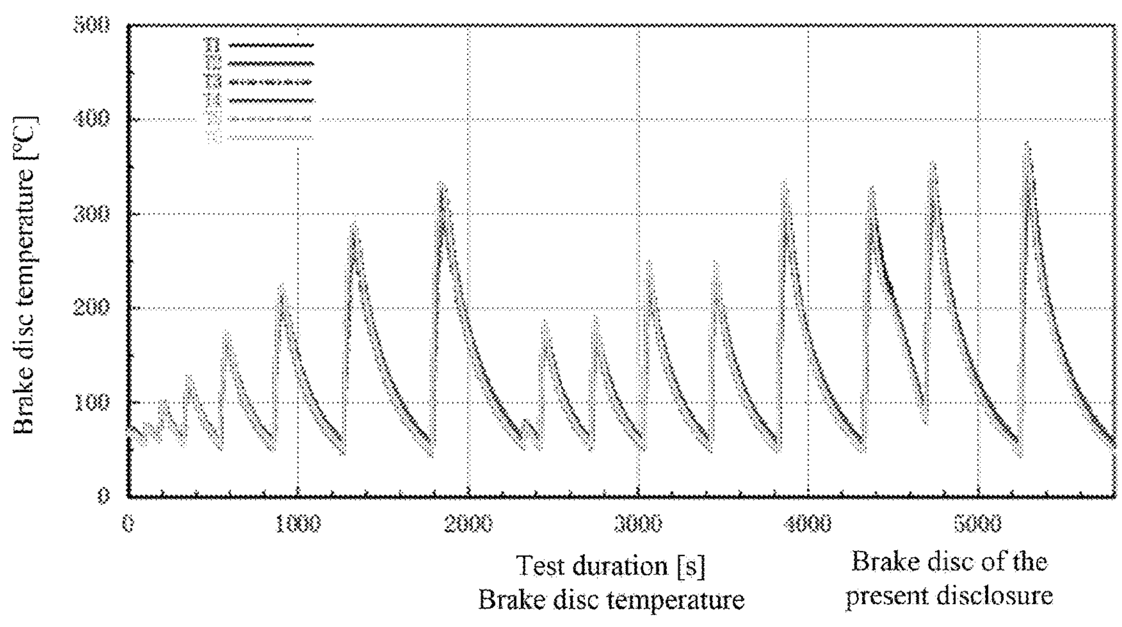
Figure 10B:
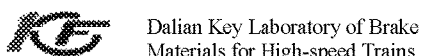
Figure 10B:
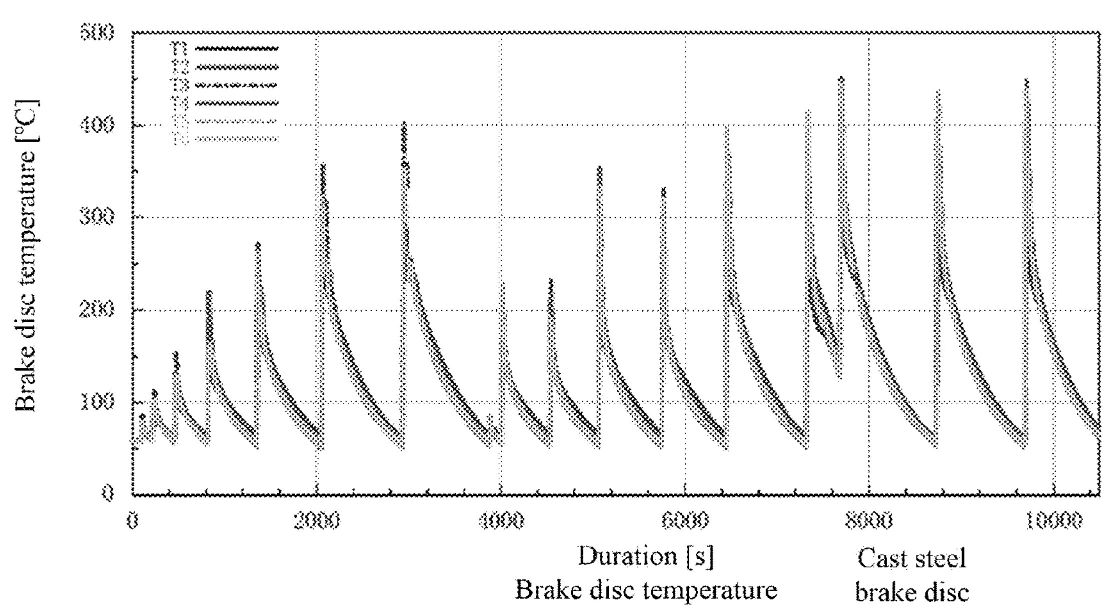

It can be seen from FIG. 10A and FIG. 10B that the temperature rise of the brake disc of the present disclosure (FIG. 10A) is 20% lower than that of the cast steel brake disc (FIG. 10B) under the same braking conditions.

Figure 11A:
FIG. 11A and FIG. 11B show a comparison of friction coefficients in the 1:1 bench tests with the brake disc of the present disclosure and the cast steel brake disc.
Figure 11A:
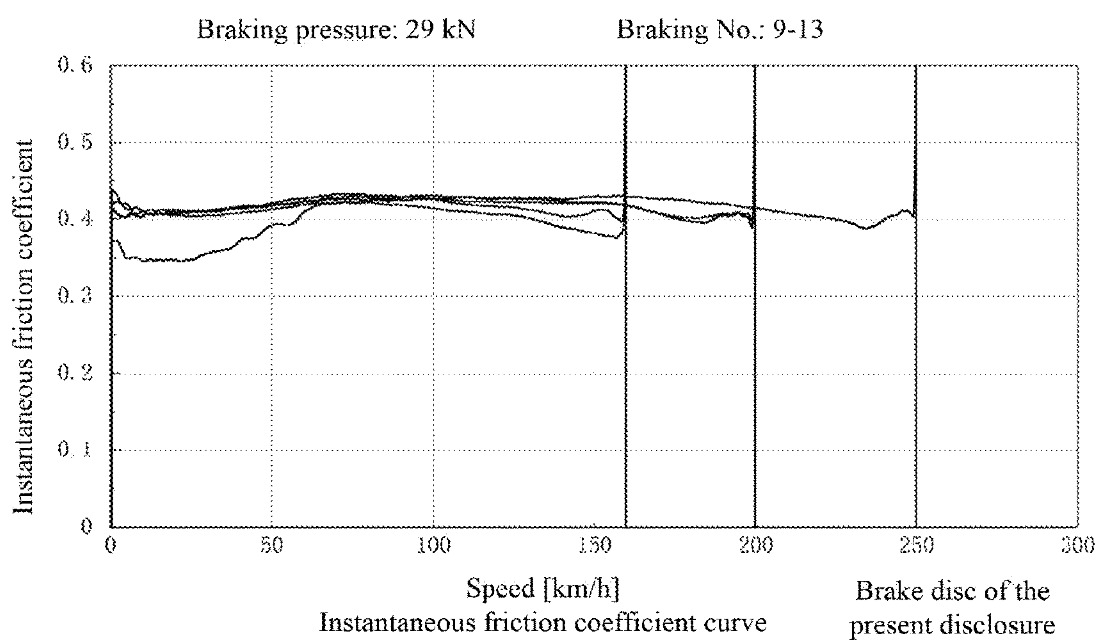
Figure 11B:
Figure 11B:
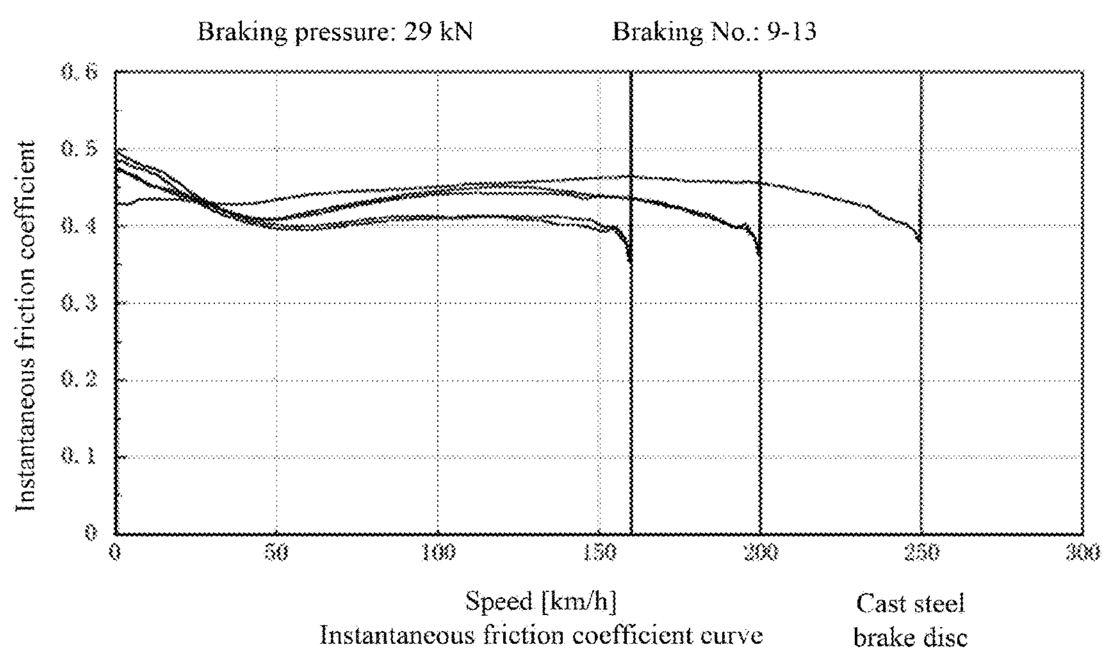

It can be seen from FIG. 11A and FIG. 11B that the curve of the friction coefficient of the brake disc of the present disclosure (FIG. 11A) is smoother than that of the friction coefficient of the cast steel brake disc (FIG. 11B) under the same braking conditions.

Figure 12A:
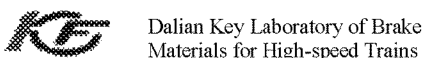
FIG. 12A and FIG. 12B show a comparison of temperatures at six temperature measuring points in the 1:1 bench tests with the brake disc of the present disclosure and the cast steel brake disc.
Figure 12A:
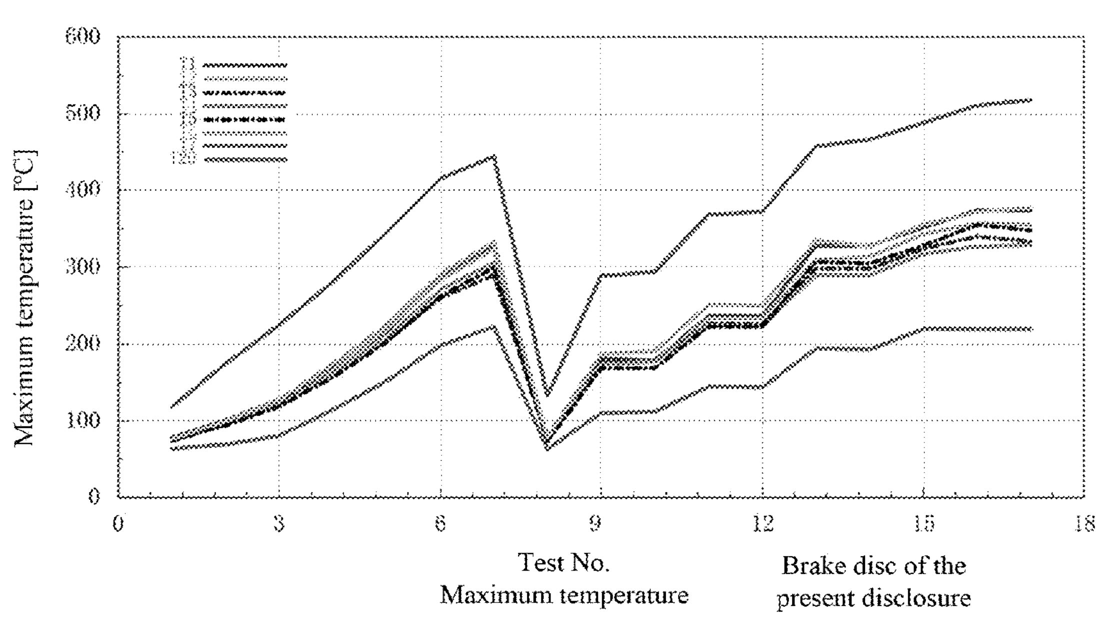
Figure 12B:
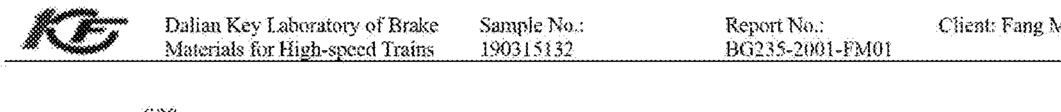
Figure 12B:
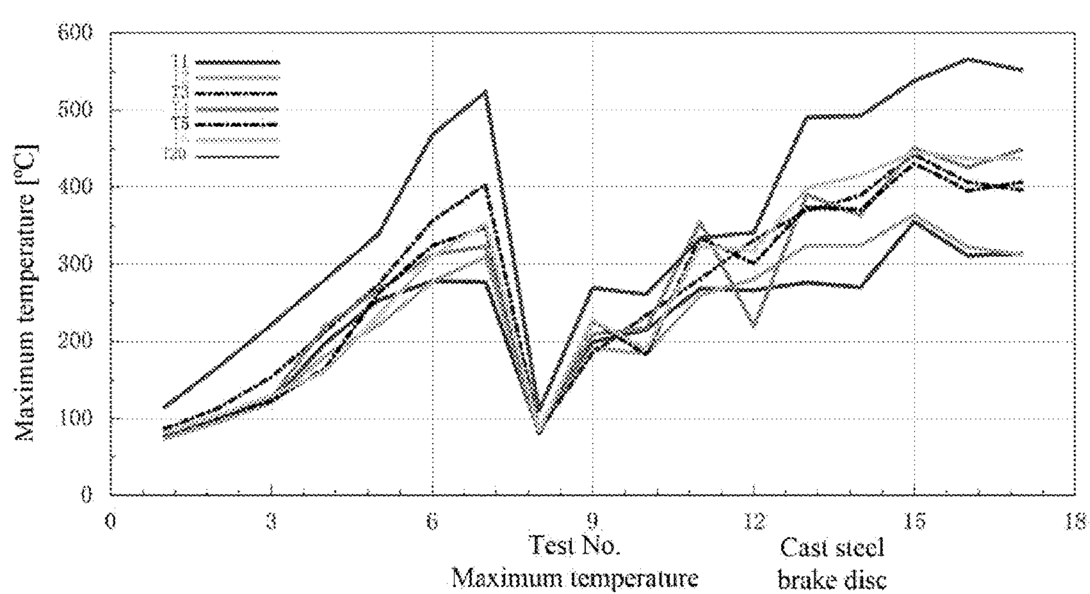

It can be seen from FIG. 12A and FIG. 12B that the temperatures of the six temperature measuring points of the brake disc of the present disclosure (FIG. 12A) are lower, more uniform and more regular than those of the six temperature measuring points of the cast steel brake disc (FIG. 12B) under the same braking conditions.

Example 3

Example 3 shows curves of partial data of a bench test of a high-speed train at 400 km/h with a BD2500/15000 brake power 1:1 test bench conducted by a third party in accordance with TB/T2980-2014 Brake disc rolling stock by using a brake disc of the present disclosure.

Figure 13A:
FIG. 13A and FIG. 13B show a friction coefficient in a 1:1 bench test with the brake disc of the present disclosure at 400 km/h.
Figure 13A:
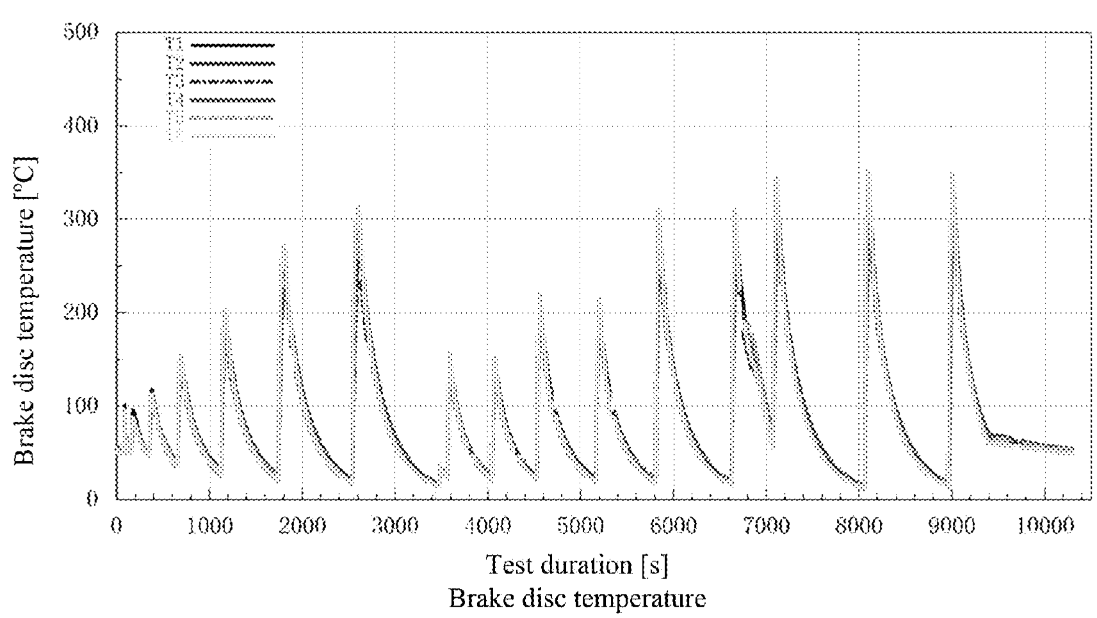
Figure 13B:
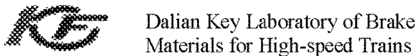
Figure 13B:
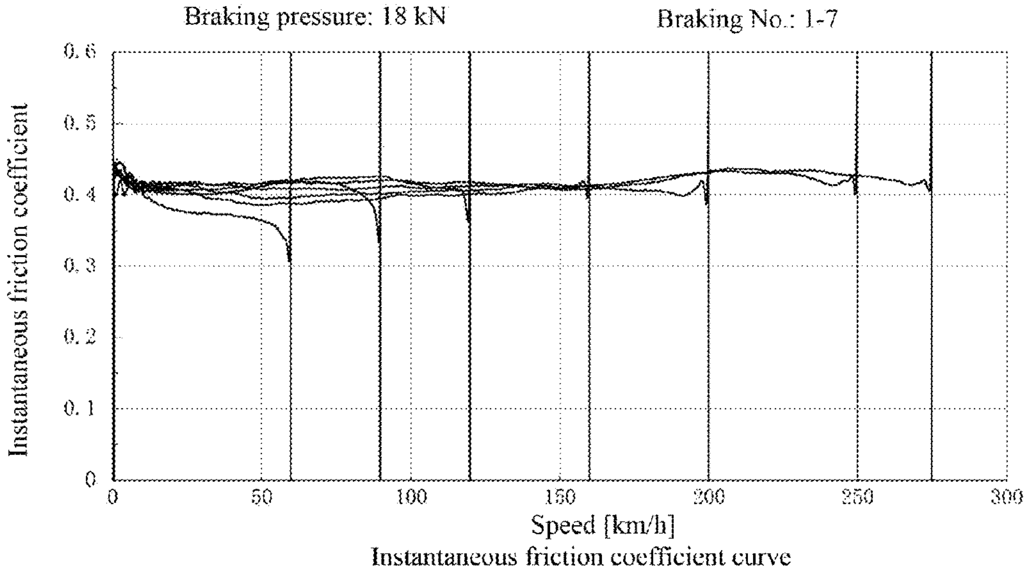

It can be seen from the test data in FIG. 13A and FIG. 13B that the light metal structure-function dual-gradient composite brake disc can meet the braking requirements of high-speed trains running at 400 km/h, and can maintain a stable friction coefficient at the maximum temperature of 520° C. on the friction surface.

Figure 14:
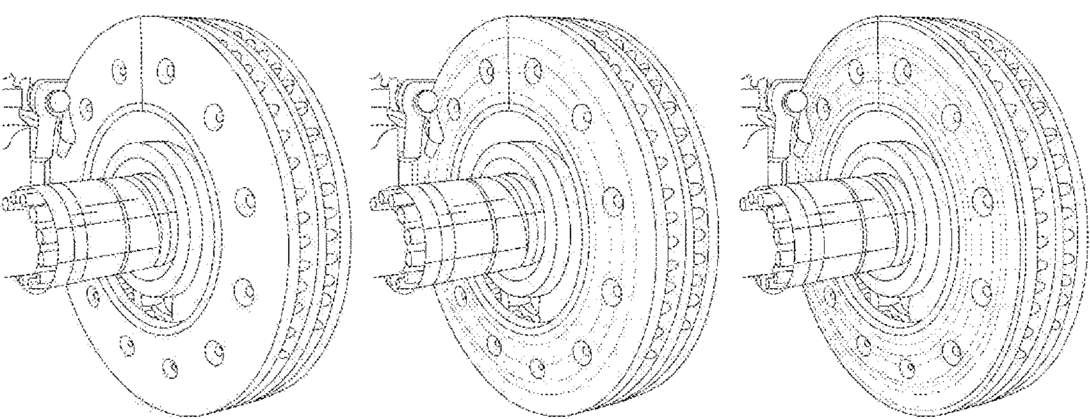
FIG. 14 shows photos before the 1:1 bench test with the brake disc of the present disclosure at 400 km/h, after running-in, and after the test.

It can be seen from the photos of the friction surface before the 400 km/h test, after running-in and after the test (FIG. 14) that the light metal structure-function dual-gradient composite brake disc can meet the maximum temperature requirement of 520° C., and due to the support of the continuous phase ceramic skeleton on the composite friction layer, the friction surface does not soften and deform, and there is no furrow on the friction surface. All properties meet the use requirements of the brake disc. Safe and effective clutch and braking for all kinds of rotating machinery can be implemented, and obvious weight reduction, energy saving and emission reduction effect is achieved.

Example 4

Example 4 shows curves of partial data of a 1:1 bench test of a passenger vehicle conducted by a third party according to the AK MASTER test outline using a brake disc of the present disclosure.

Figure 15:
FIG. 15 shows data of a 1:1 bench test of a passenger vehicle with the brake disc of the present disclosure.
Figure 15:
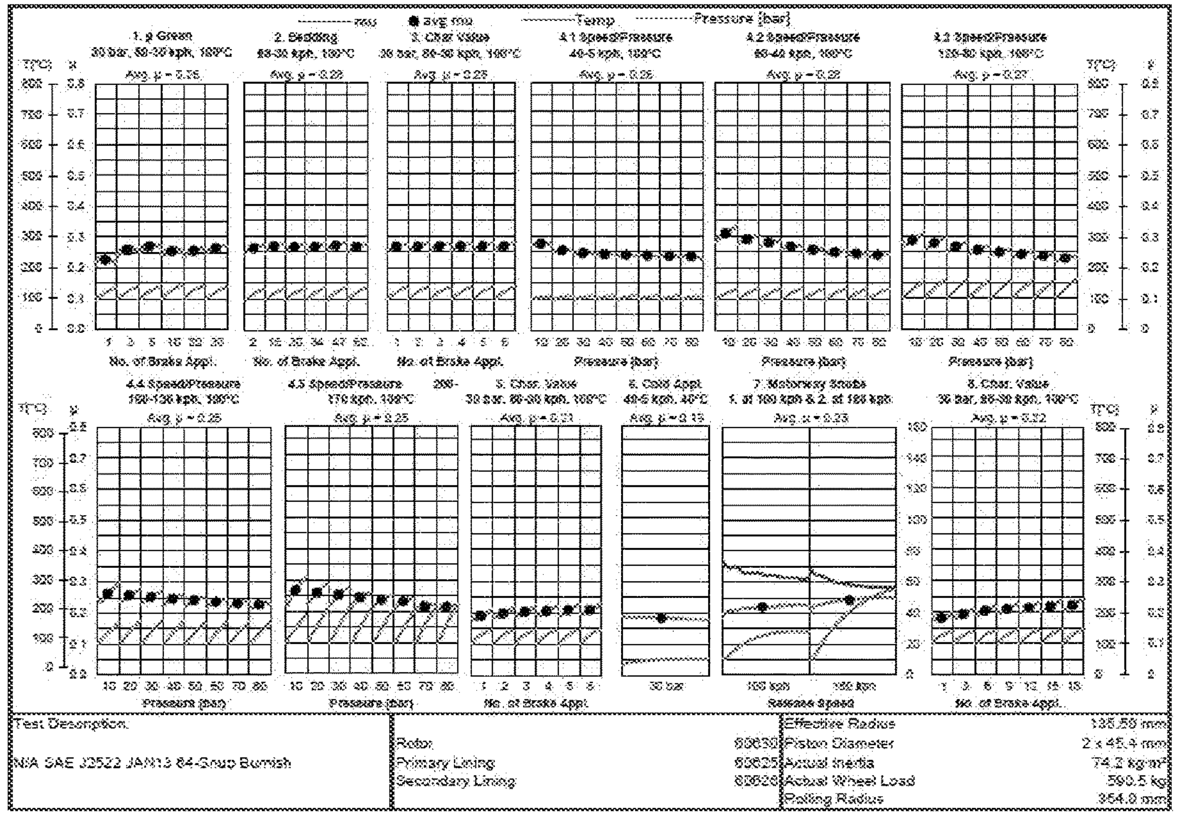

It can be seen from the test data in FIG. 15 that the brake disc of the present disclosure can fully meet the use requirements of passenger vehicles.

Figure 16:
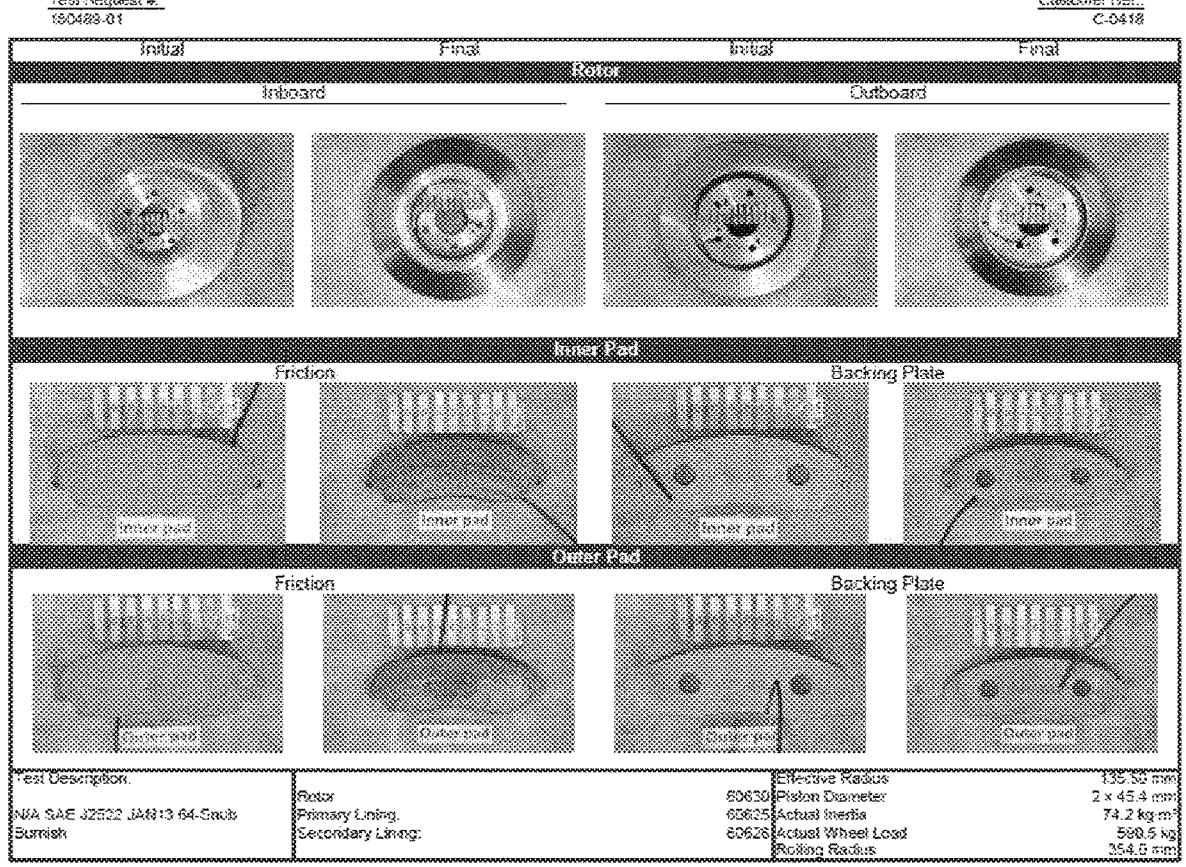
FIG. 16 shows photos before and after the 1:1 bench test of a passenger vehicle with the brake disc of the present disclosure.
Figure 17:
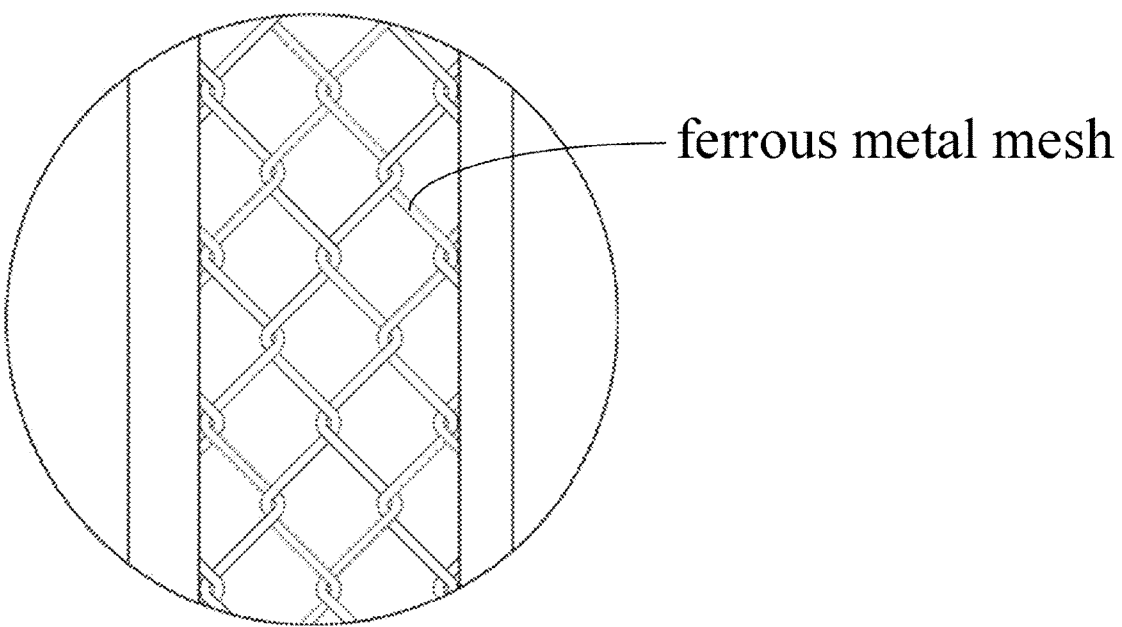
FIG. 17 is a cross-sectional schematic diagram illustrating the ferrous metal mesh embedded within the light metal structural body of the brake disc or drum.

It can be seen from the photos after the test that the friction surface of the brake disc of the present disclosure is intact without scratches (FIG. 16). As used herein, the term "dual-gradient" refers to the complementary gradients in structure and function achieved by the application. The structural gradient is primarily manifested by the gradient in pore size within the continuous ceramic skeleton along the radial direction (e.g., increasing from the friction surface inward) and by the non-perpendicular interface along the axial direction. The functional gradient is achieved by the integral composite casting process which creates a seamless transition and strong bond between the metal-ceramic friction layer and the light metal structural body, resulting in a gradient of properties (e.g., hardness, thermal conductivity) from the friction surface to the interior. As used herein, the term "light metal bearing connection" refers to the portion of the light metal structural body that is specifically configured (e.g., shaped with lug holes, a central bore, or mounting features) to connect and mount the brake disc or drum to an axle or hub assembly, thereby bearing the connection between the friction layer and the structural body. As used herein, "gradient change characteristics in pore size" refers to the deliberate and continuous variation in the average diameter of the pores or channels within the continuous ceramic skeleton. This variation is not random but is engineered to change (e.g., increase) along a direction perpendicular to the friction surface and into the depth of the disc/drum. As used herein, "wear-limit-reaching size" (or "wear-limit thickness") refers to the minimum allowable thickness of the brake disc or drum's friction layer as dictated by safety standards, performance requirements, or regulatory guidelines, beyond which the component must be replaced. Typically, the wear limit is reached when the friction surface is worn down by 1.5-2 mm. The composite friction layer of the present application is designed to be thicker than this critical limit by 1-5 mm to ensure consistent performance throughout its service life. As used herein, "ferrous metal mesh" refers to a network or grid structure made of iron or steel-based alloy (e.g., stainless steel wire mesh) that is embedded within the light metal structural body during the integral casting process. Its primary functions are to reinforce the light metal matrix, constrain its thermal expansion, and inhibit deformation under high mechanical and thermal loads.

What is claimed is:

1. A light metal composite material brake disc or brake drum, comprising:

a composite friction layer, comprising a ceramic skeleton and a light metal that are bonded together, wherein the ceramic skeleton comprises a plurality of pores; and a light metal structural body integrally bonded with the composite friction layer and forming a mounting structure;

wherein the ceramic skeleton has a bonding surface bonded to the light metal structural body, said bonding surface being substantially a slanted planar surface that is not parallel to a friction surface of the brake disc or drum, or a non-planar surface that is not parallel to the friction surface, the bonding surface exhibiting a gradient change along a radially outward direction of the light metal composite material brake disc or drum; wherein a pore diameter of each of the plurality of pores in the ceramic skeleton exhibits a gradient change along a direction from the friction surface toward the bonding surface of the ceramic skeleton;

wherein the light metal infiltrates and substantially fills each of the plurality of pores within the ceramic skeleton thus forming a monolithic composite structure with the ceramic skeleton.

2. The light metal composite material brake disc or brake drum according to claim 1, wherein the ceramic skeleton in the composite friction layer is a continuous structural phase ceramic skeleton that is made of ceramic with excellent thermal shock resistance and wear resistance and high thermal conductivity.

3. The light metal composite material brake disc or brake drum according to claim 1, wherein the composite friction layer has a thickness that is greater than a wear limit thickness of the brake disc or brake drum by 1-5 mm.

4. The light metal composite material brake disc or brake drum according to claim 1, wherein the light metal is reinforced by nano-materials; and the ceramic skeleton in the composite friction layer is reinforced by nano-ceramic particles or ceramic fibers.

5. The light metal composite material brake drum according to claim 1, further comprising a ferrous metal mesh embedded in the light metal structural body, wherein the ferrous metal mesh is configured to enhance strength and restrict thermal expansion or deformation of the light metal structural body.

6. The light metal composite material brake disc or brake drum according to claim 1, wherein the bonding surface of the ceramic skeleton is a slanted planar surface, such that a height of the ceramic skeleton measured in a direction perpendicular to the friction surface increases continuously in a radially outward direction.

7. The light metal composite material brake disc or brake drum according to claim 1, wherein the bonding surface of the ceramic skeleton is a curved surface that is convex toward the light metal structural body.

8. The light metal composite material brake disc or brake drum according to claim 1, wherein the bonding surface of the ceramic skeleton comprises two intersecting slanted planar surfaces, such that a height of the ceramic skeleton measured in a direction perpendicular to the friction surface first decreases and then increases in a radially outward direction.

9. The light metal composite material brake disc or brake drum according to claim 1, wherein the bonding surface of the ceramic skeleton comprises a serrated surface formed by a plurality of consecutive slanted planar segments.

10. The light metal composite material brake disc or brake drum according to claim 1, wherein the gradient change in pore diameter is characterized by the pore diameter gradually increasing in a direction from the friction surface toward the bonding surface.

11. The light metal composite material brake disc or brake drum according to claim 1, wherein the gradient change in pore diameter is characterized by the pore diameter gradually decreasing in a direction from the friction surface toward the bonding surface.

12. The light metal composite material brake disc or brake drum according to claim 1, wherein the plurality of pores in the ceramic skeleton comprise capillary pores configured to be infiltrated by the molten light metal under pressure during casting.

13. The light metal composite material brake disc or brake drum according to claim 1, wherein the mounting structure of the light metal structural body comprises a central locating hole and a plurality of circumferentially arranged bolt holes.

14. The light metal composite material brake disc or brake drum according to claim 1, wherein the gradient change in pore diameter of each of the plurality of pores is a monotonic change.

15. The light metal composite material brake disc or brake drum according to claim 1, wherein the light metal is an aluminium alloy.

* * * * *